United States Patent [19]

Brown

[11] 4,142,285
[45] Mar. 6, 1979

[54] TERMINAL FORMING AND INSTALLING APPARATUS

[76] Inventor: Maurice H. Brown, 11655 S. Mayfield, Worth, Ill. 60482

[21] Appl. No.: 849,751

[22] Filed: Nov. 9, 1977

Related U.S. Application Data

[63] Continuation-in-part of Ser. No. 738,639, Nov. 3, 1976, Pat. No. 4,068,367.

[51] Int. Cl.² .............................................. B23P 23/00
[52] U.S. Cl. .................................. 29/564.6; 29/33 M; 29/739; 29/759; 227/93
[58] Field of Search ................. 29/564.6, 564.8, 566.2, 29/33 M, 739, 759, 761; 227/93, 97, 141

[56] References Cited

U.S. PATENT DOCUMENTS

3,747,186  7/1973  Cervenka et al. .............. 29/564.6 X

Primary Examiner—Gil Weidenfeld
Attorney, Agent, or Firm—Kinzer, Plyer, Dorn & McEachran

[57] ABSTRACT

An apparatus for simultaneously forming a plurality of terminals from a plurality of lengths of wire and inserting the terminals simultaneously into preformed openings in a plastic part. The apparatus includes a mechanism for simultaneously moving a plurality of lengths of wire which are held in spaced relation to one another to a severing position. The wires may be arranged in both horizontal and vertical planes. At the severing position, a shear is provided for simultaneously severing end portions from the lengths of wires to form a plurality of short wire terminals. The shears and an anvil support the terminals and maintain them in spaced relation to one another after severing for insertion into the preformed openings in the plastic part. The apparatus further includes a tool which supports the plastic part. A slide moves the plastic part and the terminals into engagement with one another to thereby embed the terminals in the preformed openings of the plastic part. In a modification of the invention, the terminals are first seated in the openings and then are further embedded in a second step. A tool is provided for bending portions of the terminals after the terminals are embedded in the plastic part. The terminals may also be coined, scored or abraded after embedding. The various terminal forming and inserting tools are operated by air cylinders. The air cylinders are actuated by solenoid operated spool valves. The solenoids are sequentially energized by a programmable function generator. The various tools are easily replaceable in order to adapt the apparatus to terminal parts of varying shapes and quantities of terminals. For the same reason, the function generator can easily be reprogrammed.

14 Claims, 11 Drawing Figures

Fig. 1.

TERMINAL FORMING AND INSTALLING APPARATUS

This is a continuation-in-part of my co-pending application, Ser. No. 738,639, filed Nov. 3, 1976, now U.S. Pat. No. 4,068,367.

BACKGROUND AND SUMMARY OF THE INVENTION

The electrical and electronic industries use millions of terminal parts each year. Terminal parts include coil forms, bobbins, terminal strips and like items. These items are usually molded of plastic which may be of either the thermoplastic or the thermosetting types. The terminal parts are manufactured in various sizes, some of which are relatively small. The terminals of the smaller terminal parts are commonly formed of short pieces of wire which may be of circular or noncircular cross sections. The small pieces of wire forming the terminals are usually cut from continuous lengths of wire handled in coils. It is quite often difficult to manually insert the small pieces of wire into the smaller terminal parts.

Many different types of machines have been proposed or constructed for the purpose of inserting wire terminals into the smaller plastic terminal parts. Generally, these machines have been specially built to manufacture a few sizes or types of terminal parts and most of these machines were not readily adjustable or adaptable to manufacture terminal parts of different sizes and shapes. Further, these machines have not been suitable for manufacturing terminal parts in which it was necessary to vary the arrangement or lengths of terminal wires. Since the industry uses a variety of terminal parts, it is advantageous to provide a wire terminal inserting machine that can easily be modified or adjusted to manufacture terminal parts of varying sizes and having varying terminal arrangements.

To meet this need, this invention is concerned with an apparatus for simultaneously forming a number of short pieces of wire or terminals from a number of elongated lengths of wire and inserting the terminals in preformed openings in pieces of plastic to make parts such as coil forms, bobbins, terminal strips, etc. This invention is particularly concerned with such an apparatus in which both the type and number of wire forming tools can easily be changed and in which the sequence of operation of the forming tools can also easily be varied.

An object of this invention is an apparatus of the type described which can easily be adjusted to make plastic terminal parts of different sizes, shapes and having different numbers and locations of terminals.

Another object is a wire forming and applicator apparatus in which the wire terminals can be shaped both before and after insertion in the plastic parts.

Another object is a wire forming and applicator apparatus which can be adjusted to form wire terminals of varying lengths.

Another object is an apparatus which simultaneously forms and inserts wire terminals into a plastic part with the terminals being arranged in more than one plane.

Another object is an apparatus for forming and inserting relatively long terminals into a plastic part.

Accordingly, another object of this invention is an apparatus for simultaneously forming a plurality of terminals from a plurality of lengths of wire and inserting the terminals simultaneously into openings preformed in plastic parts. The apparatus includes means for simultaneously moving a plurality of lengths of wire which are held in spaced relation to one another to a severing position. Means are provided for simultaneously severing end portions from said lengths of wire to form a plurality of wire terminals. Means are provided for supporting said terminals in spaced relation to one another. Means are provided for supporting a plastic part having openings formed therein for receiving the terminals. Means are provided for moving the plastic part and the terminals into engagement with one another to embed the terminals in the openings in the plastic part. The terminals may be embedded in the plastic part in a single operation or if the terminals are relatively long, it may be desirable to first seat the terminals in the plastic part and then, in a separate operation, to more deeply embed the terminals in the plastic part. Means are also provided for bending portions of the terminals after the terminals have been embedded in the plastic part.

Other objects may be found in the following specification, claims and drawings.

BRIEF DESCRIPTION OF THE DRAWINGS

The invention is illustrated more or less diagrammatically in the following drawings wherein.

DESCRIPTION OF THE PREFERRED EMBODIMENTS

Figure 1:
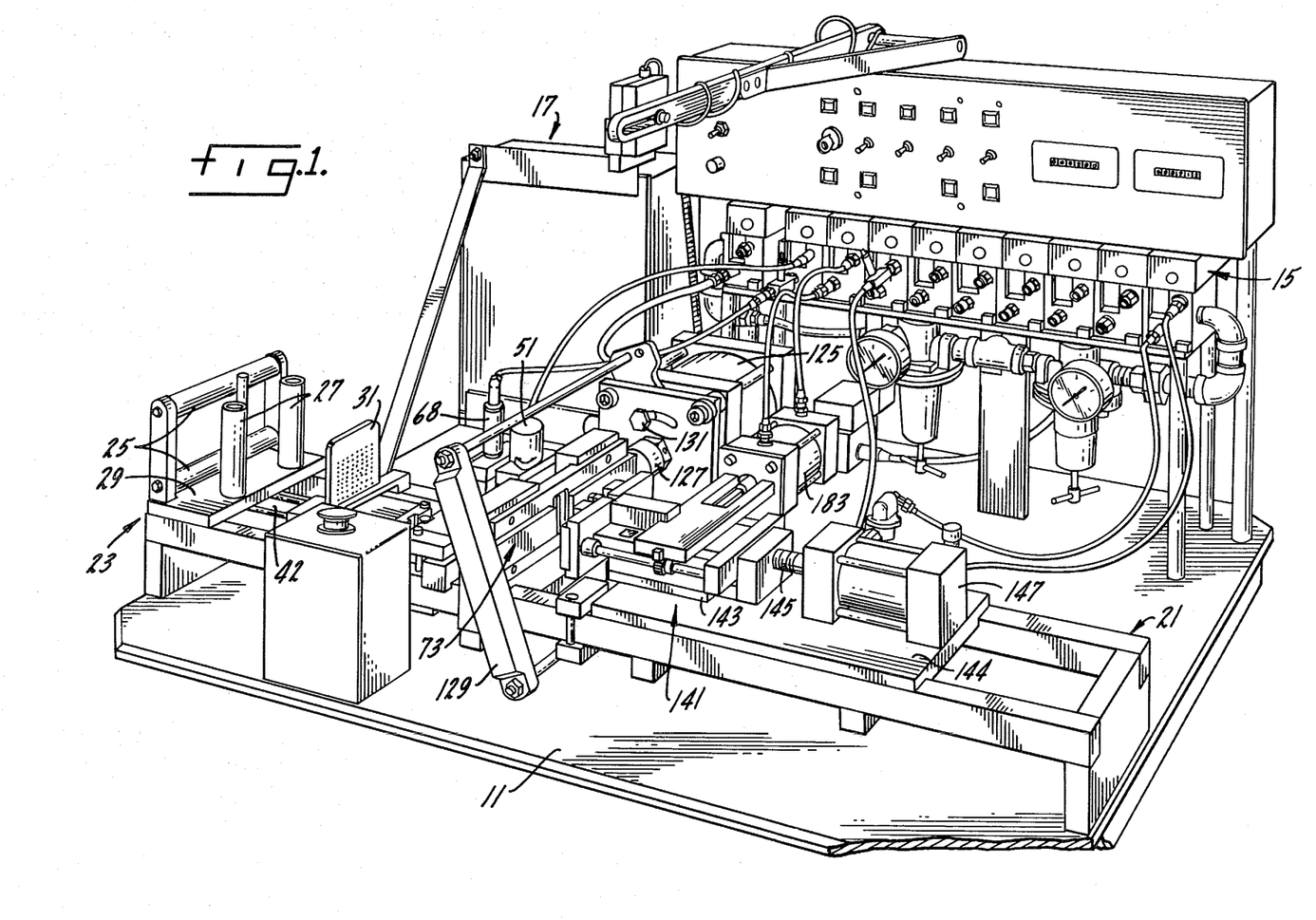
FIG. 1 is a perspective view of an apparatus embodying the novel aspects of this invention.

An apparatus made in accordance with the teachings of this invention is shown in perspective in FIG. 1 of the drawings. The apparatus includes a base 11 on which are mounted tools for forming and inserting wire terminals into openings preformed in plastic parts. A bank of solenoid controlled air valves 15 and a programmable sequence and timing signal generator 17 for controlling the operation of the solenoid controlled air valves are mounted on the base.

The programmable sequence and timing signal generator 17 includes a signal generator which is controlled by a number of individually adjustable printed circuit type timing circuits. The starting and stopping signal of each individual timing circuit is adjusted by separate selector switches actuated by thumb wheels with each timing circuit connected to a solenoid controlled air valve 15. Each timing circuit can be adjusted to vary the starting and terminating times of its signal as a percentage of the total operating cycle of the apparatus. The duration of the cycle can be independently adjusted by a separate control means. A suitable control system was designed and built by Intercontinental Dynamics Corporation of Chicago, Ill. and designated as Model FG212. Another suitable control system was supplied by Electronic Counters and Controls, Inc. of Mundelein, Ill. and designated as Model CE1-12-4. However, it should be understood that these signal generating systems are merely the preferred embodiments and other suitable control mechanisms can be adapted to the apparatus of this invention without departing from the teachings thereof.

The solenoid controlled air valves 15 are preferably four-way, two-position air valves of the spool type, but, of course, other types of air valves may be used. The present embodiment of the invention includes a bank of ten solenoid controlled air valves. In any particular application, not all of these air valves may be used. However, in some applications, one air valve 15 may be connected to more than one tool. It can readily be appreciated that the control components of this apparatus provide wide range of flexibility in regard to the number and arrangement of tools controlled by the apparatus.

The exact layout of the tools as well as their number and functions will vary in accordance with the terminal part to be manufactured. It is a feature of this invention that the layout, sequence of operation and type of tooling may easily be changed to produce different types of finished terminals, bobbins, etc. A number of tools are mounted on an elongated rectangular raised framework 21 which extends the length of the base 11. A wire support mechanism 23 is located at the left end of the framework as viewed in FIG. 1. It includes horizontally extending rollers 25 and vertically extending rollers 27. In this embodiment of the invention, both a pair of horizontal and a pair of vertical rollers are provided. However, the number of rollers may be varied in accordance with the number of horizontal and vertical rows of wire to be handled. In this embodiment of the invention, four wires W are arranged in two vertical and two horizontal rows. With other arrangements of wires, the number and arrangement of horizontal and vertical rollers may be varied. Both the horizontal and vertical rollers are mounted on a stand 29 which is attached to the framework 21 at the left hand end thereof. A wire guide 31 is mounted on the framework inwardly of the rollers. The wire guide is formed of a block of material such as plastic and has a plurality of wire receiving holes cut therethrough and forming a grid pattern. The wire receiving passages or holes are formed a predetermined distance apart so that the wires may be passed therethrough for different arrangements of wires in the finished part. The wires are fed to the rollers and wire guide either from spools or from bicycle tire rims, which are not shown.

The mechanism for moving the wires W includes a wire pulling or feeding device 33. This device, shown in detail in FIGS. 4 and 6, consists of a stack of thin, flat, rectangular plates 35 which fit over a pair of spaced upstanding rods 37 (FIG. 4) mounted on a base plate 39. Cap screws 40 threaded into the rods limit upward movement of the plates. The base plate rides on the framework 21 and is connected to the end of a piston rod 41 extending from an air cylinder 42 mounted beneath and supported on the framework 21. An angle 43 connects the base plate and the piston rod. A plate 45 is connected to the base plate 39. The length of the plate 45 may be varied in accordance with the length of terminal wires to be formed. The plate 45 engages a stop 47 on the return stroke of the air cylinder to limit movement of the wire pulling device 33 towards the air cylinder. The stop 47 is attached to the framework 21 by a cross plate 48 and extends through a slot 49 formed in the base plate 39.

Figure 4:
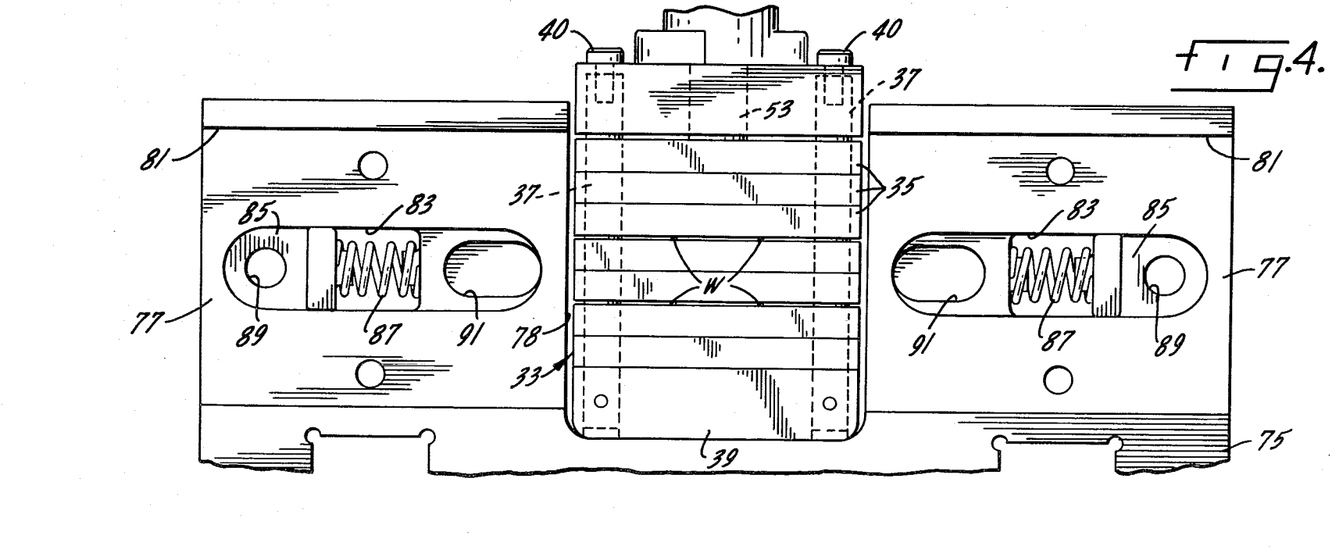
FIG. 4 is an enlarged view taken along line 4—4 of FIG. 2.
Figures 6, 7, 8:
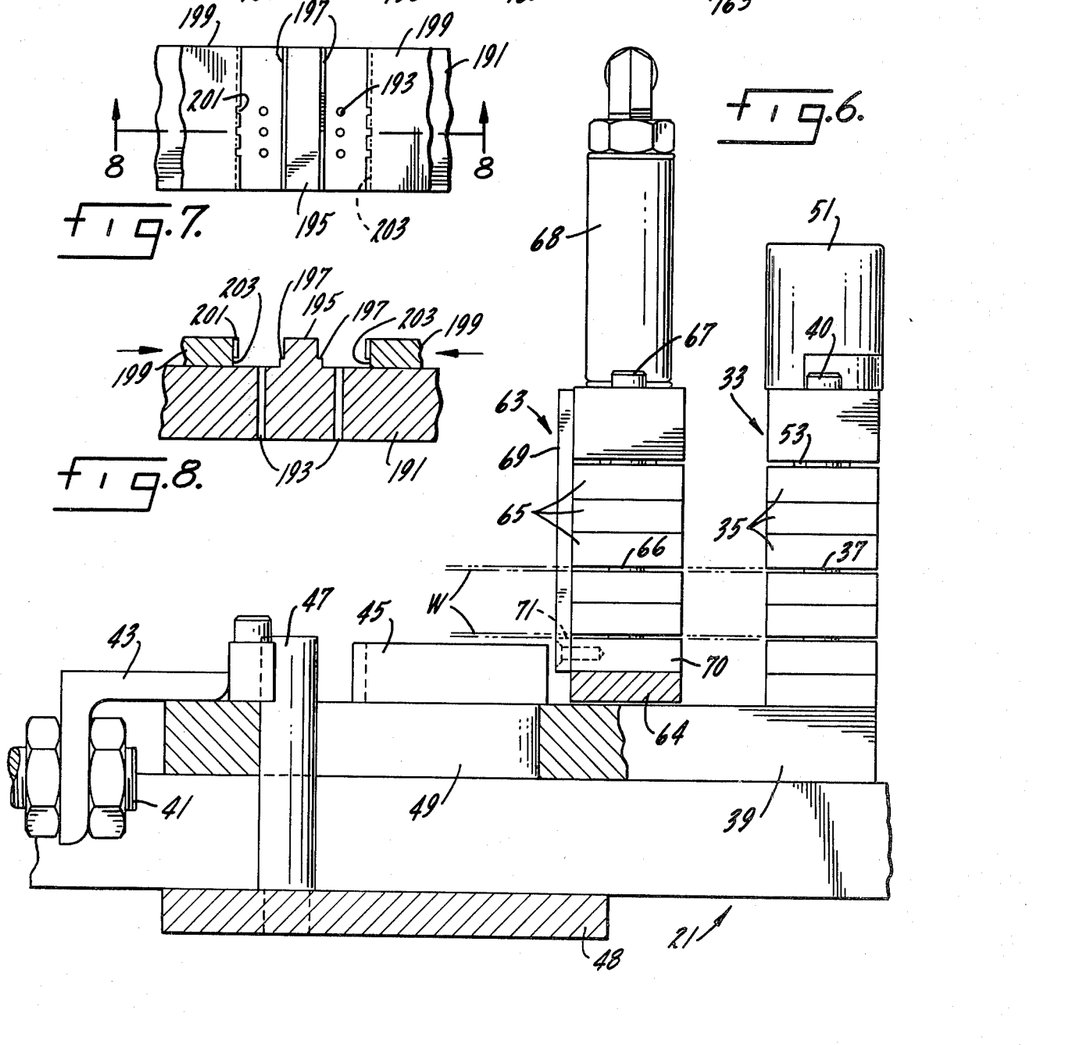
FIG. 6 is a partial enlarged view of the wire clamping and moving elements.
FIG. 7 is a partial front elevational view of a modified form of wire shears and anvil.
FIG. 8 is a cross-sectional view taken along line 8—8 of FIG. 7.

An air cylinder 51 is mounted on the top plate 35 of the wire pulling device 33 and has a piston rod 53 which extends through the top plate and engages the upper surface of the plate 35 located below the top plate. When the plates are loosely mounted on the spaced rods 37, wires W can be inserted between the plates and the plates and wires can be moved freely relative to each other. When these plates are clamped together by actuation of the air cylinder 51 and its piston rod 53, the stack of plates 35 and the wires W will move together upon movement of either. Thus, when the stack of plates 35 is clamped together against the wires W and is moved by the action of the piston rod 41, it will pull the wires W to a shearing position, to be described later. Two levels or horizontal rows of wires W are shown extending between the plates 35. This is merely one possible arrangement of wires. For example, wires could be positioned between each set of plates, if desired. Further, the number of plates in the stack may be varied.

A wire holding mechanism 63 similar in construction to the wire pulling mechanism 33 includes a stack of plates 65. The wire holding mechanism is mounted on a fixed support 64 positioned on the framework 21 between the wire guide 31 and the wire pulling mechanism 33. The plates are loosely stacked on spaced upstanding rods 66 with the top plate restrained against upward movement by cap screws 67 threaded into the rods 66. An air cylinder 68 is mounted on the top plate of this stack of plates and has a piston rod which engages the upper surface of the plate beneath the top plate to clamp the lower plates of the stack together.

A wire guide 69 is fastened to the base 70 of the wire holding mechanism 63. Two spaced vertical slots 71 (FIG. 2) are formed in the wire guide with the slots extending from the top of the guide and terminating short of the lower edge thereof. Although two slots are shown in this embodiment of the invention, it should be understood that the number of slots may be varied in accordance with the number of vertical rows of wires to be installed in the terminal part to be manufactured. The slots function to maintain vertical alignment of the wires as they move through the wire holding and wire pulling mechanisms.

The air cylinders 51 and 68 of the wire pulling and clamping mechanisms are connected to opposite outlets of an air valve 15 so that when one stack of plates is clamped, the other is unclamped. Thus, the wire holding mechanism 63 will be clamping the wires when the wire pulling mechanism 33 is moving relative to the wires on the return stroke of the piston rod 41. The length of the return stroke is controlled by the length the adjustable plate 45 with the return stroke determining the length of wire fed in each stroke by the wire feeding mechanism 23.

Figure 3:
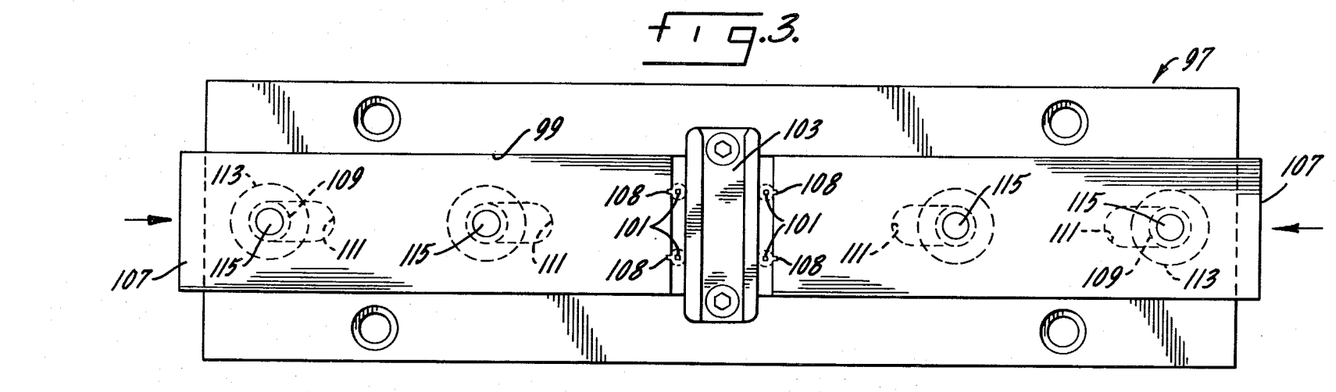
FIG. 3 is an enlarged view taken along line 3—3 of FIG. 2.

A wire shearing mechanism 73, shown in detail in FIGS. 3 and 4, is mounted on the framework 21 inwardly of the wire feeding mechanism 23. The wire shearing mechanism 73 includes a wire die holder 75 which is supported on and straddles the framework 21. The wire die holder 75 includes integral upstanding portions 77 located on opposite sides of the framework. The wire feeding mechanism 33 is received in a valley 78 located between said upstanding portions 77. Aligned horizontally extending channels 81 are formed in the upstanding portions 77 on the side of the wire die holder 75 opposite to that facing the wire feeding mechanism 23. These channels are of rectangular cross-section and each extends completely across its upstanding portion 77 of the wire die holder 75. An elongated slot 83 is formed in the base of each channel. A slide 85 biased outwardly by a spring 87 is positioned in each slot. The slide carries a circular socket 89. An elongated fixed socket 91 is formed at the inner end of each slot 83.

A wire die 97 seats in the channels 81 in the upstanding portions 77 of the wire die holder 75 and is fastened thereto by threaded fasteners. A horizontally extending channel 99 of rectangular cross-section is formed in the face of the wire die and opens in a direction away from the wire die holder. A suitable number of wire passages 101 are formed in the die and arranged in the same pattern as the wire receiving openings in the plastic part. The wire passages have tapered entrances on the wire feed side of the die. In this example of the invention, four wire passages of rectangular cross-section are arranged in a square pattern. The wire passages could be circular in cross-section and the layout pattern can be varied in accordance with the arrangement of wires in the terminal part.

An anvil 103 is fastened to the wire die and is positioned between the vertical rows of wire passages. A pair of opposite facing shears or blades 107 are slidably mounted in the channels 99 for movement towards and away from the anvil. Wire supporting notches 108 are formed in the blades and align with the wire passages 101. Sleeves 109 extend from the shears 107 through elongated slots 111 formed in the bases of the channels 99. Washers 113 located on the opposite side of the wire die from the shears span the elongated slots. Cap screws 115 threaded into the shears 109 engage the washers and fasten the shears to the wire die 97. The heads of the cap screws 115 are sized to seat in the slots 89 formed in the spring biased slides 85 located in the wire die holder. This arrangement provides a spring return for the shears. In both the cutting and return positions of the shears, the ends of the shears extend outwardly of the ends of the wire die 97. It should be noted that there is sufficient space between the wire passages 101 and the anvil 103 to permit the severed portions of the wires to be moved out of alignment with the wire passages, thus providing a backing surface for the severed pieces of wire or terminals to support the terminals firmly during insertion into the plastic part.

The shears 107 are moved through their cutting strokes into engagement with the anvil 103 upon actuation of a free floating air cylinder 125. The air cylinder has a bumper 127 connected to its piston rod 128 and a yoke 129 connected to the cylinder body. The bumper engages the outer end of one shear 107 while the yoke engages the outer end of the opposite shear 107. Upon actuation of the air cylinder, the shears are moved together in a squeezing action. A spring return (not shown) mounted on the air cylinder retracts the bumper and yoke. As previously mentioned, the shears 107 are retracted after their cutting strokes by action of the spring actuated slides 85 carried by the wire die holder 75. The yoke is mounted on the air cylinder 125 by a bolt and arcuate slot arrangement 131 to permit rotation of the yoke about a horizontal axis through an arc of approximately 60° to provide flexibility in engaging the yoke with the shears.

Figure 2:
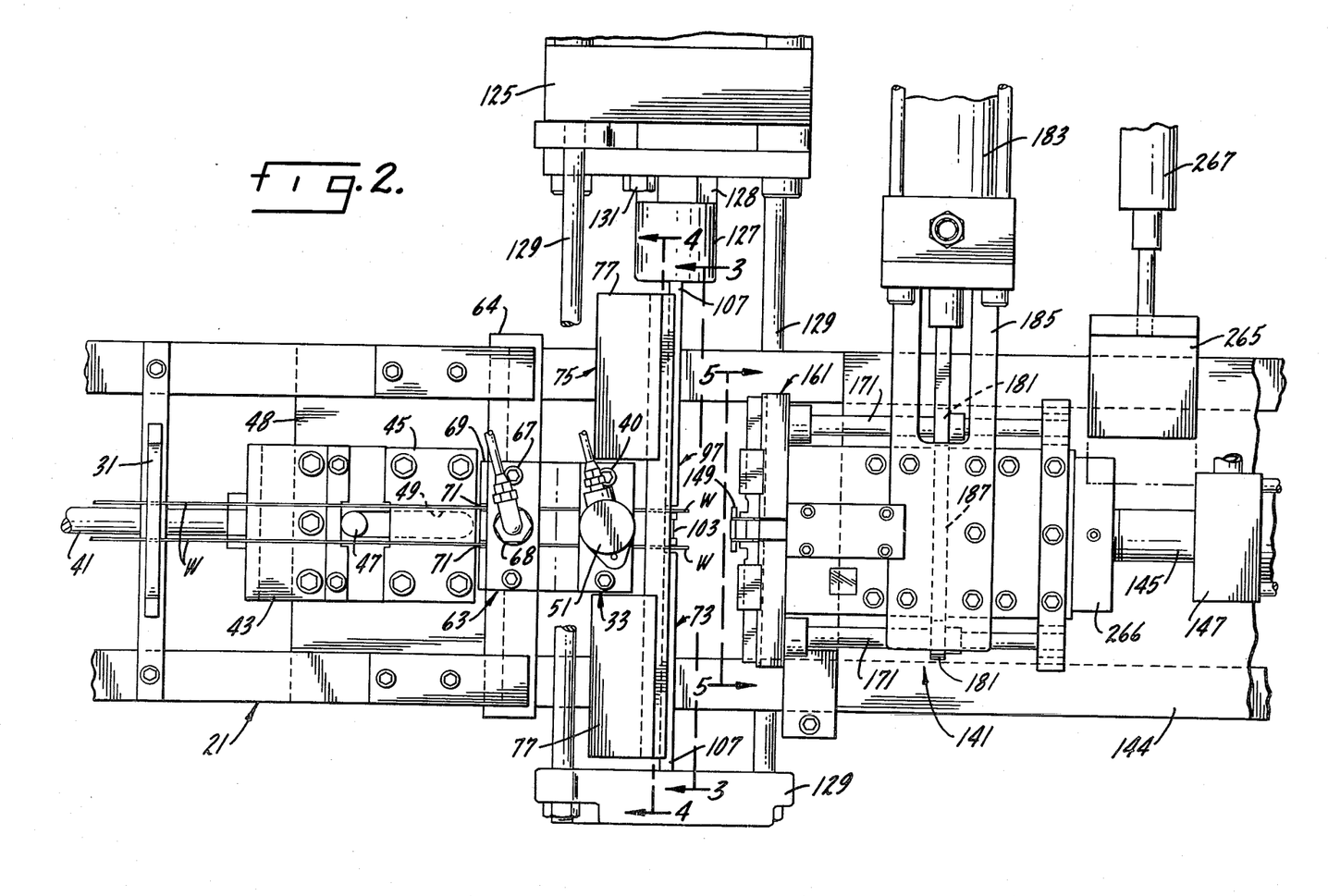
FIG. 2 is a partial top plan view of the apparatus of FIG. 1.
Figure 5:
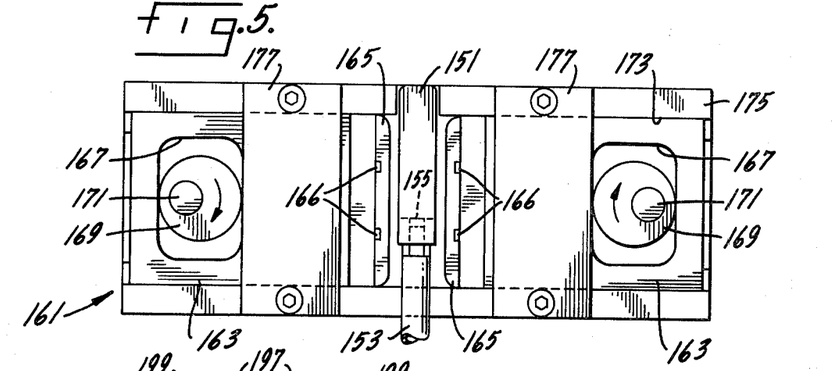
FIG. 5 is an enlarged view taken along line 5—5 of FIG. 2.

A part feeding tool 141 is slidably mounted on a base 143 for reciprocal movement towards and away from the wire die anvil 103 (FIGS. 1, 2 and 5). A mounting base 144 which carries base 143 is supported on the framework 21. The tool is reciprocated by means of a rod 145 extending from an air cylinder 147, also mounted on the base 144. The part, in this example, a plastic bobbin 149, is carried on an upwardly opening U-shaped support 151 mounted on the end of the tool 141 facing the wire die anvil 103. The U-shaped support is mounted for limited sliding movement towards and away from the wire die anvil and is biased by a spring (not shown) towards the anvil. The part feeding tool 141 is moved against the wire die holder 75 after the wire terminals have been sheared from the wires W. The wire terminals are held by the shears 107 against the anvil 103 in alignment with preformed openings in the plastic bobbin 149. As the part feeding tool and wire die holder come together, the U-shaped support 151 contacts the anvil 103 and is forced backwards against its spring bias and the wire terminals are forced into the openings in the plastic part. An air hose 153 is connected to an opening 155 in the base of the U-shaped support to permit the introduction of air under pressure to discharge the plastic bobbin from the U-shaped support after the terminal wires have been inserted in the plastic part.

A wire bending mechanism 161 (FIG. 5) is carried on the part feeding tool 141. The wire bending mechanism includes a pair of wire bending blades 163 each of which has a wire engaging hook-like portion 165 at the end thereof adjacent the U-shaped support 151. In this example, each blade includes a pair of projections 166 which fit in recesses in the part 149 to engage the terminals. A generally rectangular shaped opening 167 is formed in the outer end of each blade creating a cam follower surface. A circular cam 169 eccentrically mounted on the end of a shaft 171 is located in each rectangular opening and engages the cam follower surface. The blades are guided for reciprocating movement in a channel 173 formed in a cross piece 175 mounted on the part feeding tool 141. Loops 177 removably fastened to the cross piece 175 hold the wire bending blades in the channels.

The shafts 171 which carry the eccentrically mounted circular cams 169 extend parallel to each other along the sides of the part feeding tool 141. A sprocket gear 181 is mounted on each shaft 171 intermediate its ends with the gear on one shaft aligned with the gear on the other shaft. An air cylinder 183 is mounted on the tool 141 by means of a support member 185. The air cylinder has an elongated geared rack 187 extending at right angles to the shafts 171 with the teeth of the gear rack engaging the teeth of the sprocket gears 181 so that actuation of the air cylinder 183 causes rotation of the sprocket gears 181, rotation of the cams 169 and reciprocal action of the wire bending blades 163. Since the air cylinder 183 is mounted on the tool 141, it moves with the tool.

A modified embodiment of the wire die, anvil and shears is shown in FIGS. 7 and 8 of the drawings. These modified tools are used to form terminals which can be anchored in the openings of a plastic part. The terminals thus formed do not require bending after they have been inserted in the plastic part to firmly hold them in the part.

A modified wire die 191 having two rows of wire passages 193 with three wire passages in each row is shown. In this embodiment, the wire passages are circular in cross-section. The deforming of ends of the terminals permits the anchoring of terminals of circular cross-section in openings of circular cross-section and eliminates the need for wire of non-circular cross-section.

An anvil or terminal stop means 195 is formed integrally with the wire die on the face thereof. The anvil is located between the rows of wire passages 193. A laterally projecting offset or step 197 is formed on each side of the anvil facing a row of wire passages.

A pair of oppositely facing shears or blades 199 are slidably mounted in the channel 99 of the wire die for movement towards and away from the anvil. Wire supporting rectangular notches 201 are formed in the blades and are aligned with the wire passages. The blades are undercut at 203 adjacent the anvil to the depth of the notches and have a height sufficient to compliment the steps or offsets 197 formed on the anvil 195.

When the blades 199 are moved into engagement with the anvil 195, the wires W projecting out of the wire passages 193 are severed, thereby forming terminals which are carried in the notches 201 of the blades to the anvil. As the terminals are moved into contact with the anvil, the ends of the terminals adjacent the wire die 191 engage the steps 197 of the anvil and are deformed out of alignment with the remaining portions of the terminals. The distorted portions of the terminals form what can be called anchors which are firmly seated in openings in the plastic part which is moved into contact with the terminals by the part feeding tool 141.

As part feeding tool 141 and the wire die blades 199 which are supporting the terminals are moved together, the U-shaped support 151 contacts the anvil and is forced backwards against its spring bias. The undistorted portions of the wire terminals are moved into the openings in the plastic part thereby seating the terminals up to the depth of the distorted portions or anchors. The part feeding tool is retracted and then is again moved toward the wire die blades. A pusher plate, which is not shown, is positioned between the wire die blades and the U-shaped support 151. The pusher plate engages and forces the distorted portions of the terminals into the openings in the plastic part thereby anchoring the terminals to the plastic part.

Figure 9:
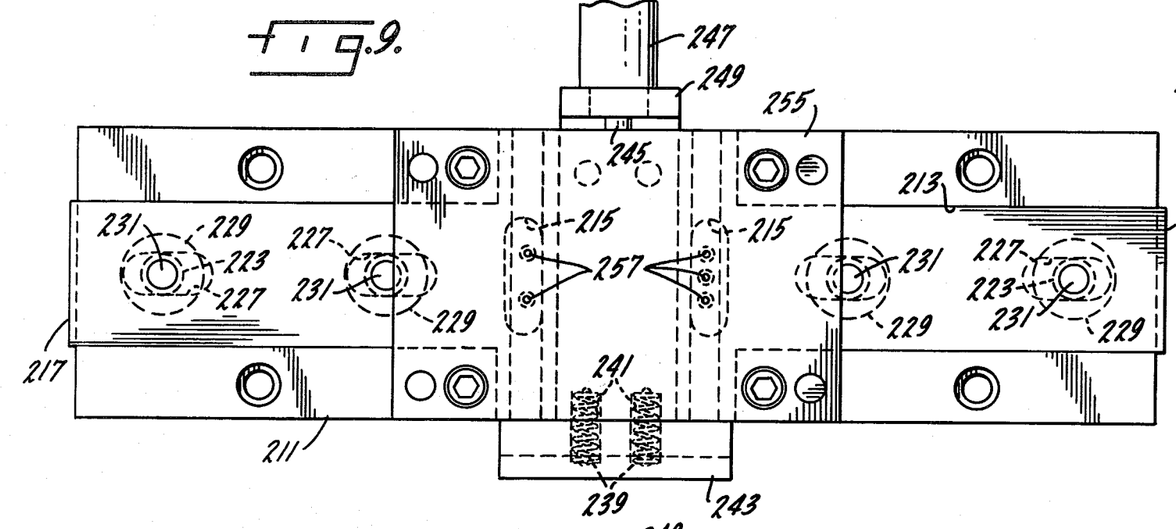
FIG. 9 is a front elevational view of a modified form of wire shears.
Figure 10:
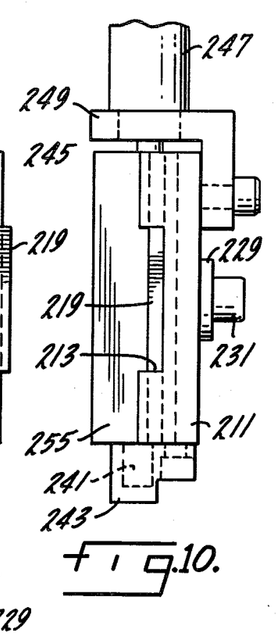
FIG. 10 is a side elevational view of the mechanism of FIG. 9.
Figure 11:
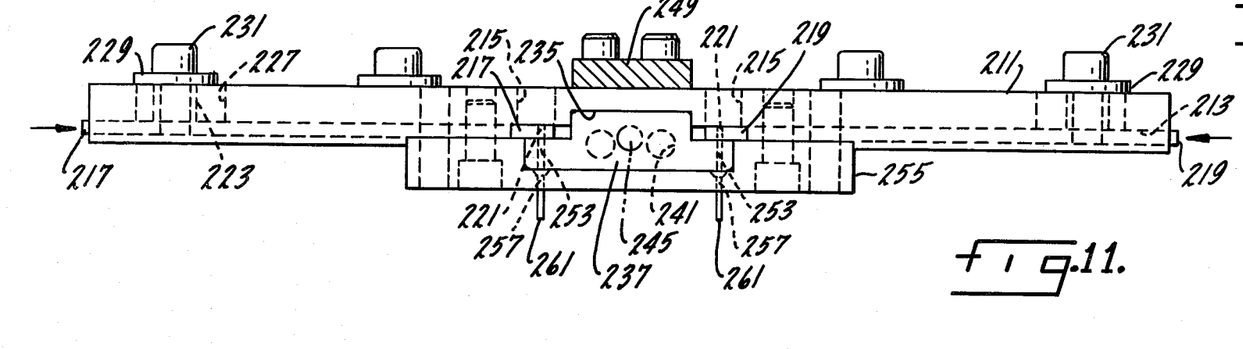
FIG. 11 is a top plan view of the mechanism of FIG. 9.

Another modified embodiment of the wire die and shears is shown in FIGS. 9, 10 and 11 of the drawings. These modified tools are used to form relatively long terminals which can be inserted into openings of a plastic part without causing bending, bowing or misalignment of the terminals during insertion. This modified wire die and shears can be used with the previously described wire die holder 75.

The wire die 211 has a longitudinal extending channel 213 formed in one face thereof. A pair of elongated wire receiving slots 215 extend through the back of the wire die and into the channel 213. A pair of shears 217 and 219 are mounted in the channel 213 for reciprocal movement towards and away from each other. Two wire passages 221 of circular cross-section are formed in the shears 217 and three similar wire passages 221 are formed in the shears 219. The wire passages in the shears align with the elongated wire slots 215 in the wire die. Sleeves 223 extend from the shears 217 and 219 through elongated slots 227 formed in the base of the channel 213. Washers 229 located on the opposite side of the wire die from the shears span the elongated slots. Cap screws 231 threaded into the shears 217 and 219 engage the washers and fasten the shears to the wire die 211. The heads of the cap screws 231 are sized to seat in the slots 89 formed in the spring biased slides 85 located in the wire die holder 75. This arrangement provides a spring return for the shears.

A transverse channel 235 is formed in the wire die 211 and extends at right angles to the channel 213. A sliding insert 237 of generally T-shaped cross-section is slidably mounted in the transverse channel 235. Springs 239 seated in sockets 241 in a base plate 243 bias the insert in a direction away from the base plate. A plunger 245 of an air cylinder 247 mounted on a bracket 249 attached to the wire die 211, engages one end of the sliding insert 237 to resist the action of the springs 239. The bracket 249 also function as a limit for movement of the sliding insert away from the base plate 243.

Wire passages 253 formed in the sliding insert 237 align with the wire passages 221 in the shears 217 and 219 when the shears are in their fully spaced apart or open positions shown in FIG. 9. A front plate 225 fits over the face of the sliding insert 237 and has wire passages 257 which align with wire passages 253 in the insert when the insert is in its lowered position and engaging the base plate 243, as shown in FIG. 9.

In use, the wire clamping and moving mechanism 63 would move a plurality of wires W each through aligned passages 221 in the wire die 211, passages 253 in the sliding insert 237, and passages 257 in the front plate 255 until the wires W extend approximately ¼" beyond the face of the front plate. The shears 217 and 219 are moved together by the actuation of the free floating air cylinder 125 to shear the wires W just inwardly of the T-shaped insert 237. The shears 217 and 219 then function as backup plates for the terminals 261 cut from the ends of the wires W.

A plastic part carried by the part feeding tool 141 is moved into contact with the portions of the terminals 261 extending beyond the face of front plate 255 of the wire die assembly, thereby seating the outwardly extending ends of the terminals 261 in the plastic part. The part holder 141 is then retracted until it engages a stop member 265 (FIG. 2) which has been moved in behind the base 266 of the part feeding tool by actuation of an air cylinder 267. The stop member 265 is positioned relative to the part holder 141 so as to permit retraction of the terminals 261 a distance equal to the length of the passages 253 in the sliding insert 237. With the terminals 261 in effect pulled out of the passages of the sliding insert 237, the air cylinder 247 is deactuated allowing the springs 239 to bias the sliding insert towards the bracket 249 and thereby moving the wire passages 253 out of alignment with the terminals 261 held in the front plate 255. The sliding insert 237 then becomes a backing member for the terminals 261. The part holder 141 is again moved toward the shears by action of its air cylinder 147 thereby forcing the terminals 261 to be embedded a greater distance into the plastic part.

The terminals 261 extending outwardly of the plastic part may then be bent, coined or otherwise manipulated by a mechanism similar to the wire bending mechanism 161. The part 141 is then retracted to pull the terminals completely out of the passages 257 of the front piece 255 permitting ejection of the completed part from the part holder 141.

This modified process which involves first seating the wire terminal in the plastic part and then further embedding it, is especially useful when the terminal extends through a rib, flange or other projection of a plastic part. The wire terminal is usually first seated to the full depth or thickness of the rib, flange or projection. The embedding then forces the leading end of the terminal completely through and beyond the rib, flange or projection while embedding the middle section of the terminal in the plastic. The portions of the terminal extending beyond the plastic rib, flange or projection may be bent, coined or otherwise worked upon by a mechanism similar to the wire bending mechanism 261.

One of the reasons that the apparatus of this invention can easily be modified to make plastic terminal parts of different sizes, shapes and having different quantities and locations of wire terminals is that the tools such as the wire dies 97 and 191, the anvils 103 and 195, the shears 107 and 199 and the part feed tool 141 are bolted to the apparatus and therefore can easily be changed. This is also the case with the wire bending mechanism 161. The wire bending blades 163 are easily replaceable. Also, the provision of the programmable sequence and timing signal generator 17 with its individually adjustable printed circuit type timing circuits each of which controls a solenoid controlled air valve 15 which can be connected to any tool gives almost unlimited flexibility to the apparatus.

The foregoing description is directed to the parts of the apparatus of this invention whose construction and operation require a detailed description in order that a person skilled in the art will be able to practice the invention. There are other parts shown in the drawings which have not been described, such as the operator's button controlled operating switch for each cycle, the electric control panel with its switches, lights and counters, the electric eye safety control mounted on the control panel, pressure gauges, filters and valves for the air supply and flexible tubing connecting the solenoid controlled air valves 15 with the various air cylinders. This does not mean that these parts are unimportant to this apparatus, but only that they are so well known to those skilled in the art that their construction and function can be understood merely from a showing in the drawings.

I claim:

1. An apparatus for simultaneously forming a plurality of terminals from a plurality of lengths of wire and inserting the terminals simultaneously into openings preformed in a plastic part, said apparatus including:
   means for simultaneously moving a plurality of lengths of wire held in spaced relation to one another to a severing position,
   means for simultaneously severing end portions from said lengths of wire at said severing position to form a plurality of terminals,
   means for supporting said terminals in spaced relation to one another,
   means for supporting a plastic part having openings formed therein for receiving said terminals,
   means for moving said plastic part and said terminals into engagement with one another to first seat said terminals in said openings in said plastic part, and
   means to increase the distance said terminals extend beyond said terminal supporting means so that further movement of said plastic part and terminals into engagement with one another will more deeply embed said seated terminals in said openings in said plastic part while supporting said terminals in said supporting means.

2. The apparatus of claim 1 in which said means for more deeply embedding said terminals in said plastic part while supporting said terminals in said supporting means includes means for moving said seated terminals a predetermined distance from said severing means, means for backing said seated terminals after said movement and means for further moving said plastic part and said terminals into engagement with one another while said terminals are being engaged by said backing means to more deeply embed said terminals in said plastic part.

3. The apparatus of claim 1 in which means are provided for sequentially activating said wire moving, wire severing and plastic part and terminals moving means according to an adjustable predetermined timing relationship.

4. The apparatus of claim 1 in which means are provided for bending portions of said terminals after said terminals are more deeply embedded in said plastic part.

5. The apparatus of claim 1 in which said means for simultaneously moving a plurality of lengths of wire held in spaced relation to one another to a severing position includes:
   a plurality of plates stacked one upon the other,
   said stack extending perpendicular to the lengths of said wire,
   said plurality of lengths of wire extending between pairs of plates of said stack of plates,
   said lengths of wires being movable between said plates when said plates are loosely stacked one upon the other,
   means to releasably clamp said plates together to prevent said lengths of wire from moving between said plates, and
   means to move said stack of plates towards and away from said severing position.

6. The apparatus of claim 4 in which means are provided to hold said plurality of lengths of wire when the wire moving stack of plates is unclamped, said means including:
   a wire guide,
   at least one wire receiving slot formed in said guide,
   a plurality of plates stacked one upon the other,
   said stack extending along the length of said wire receiving slot and perpendicular to said lengths of wire,
   said plurality of lengths of wire extending through said guide with the lengths of wire extending between pairs of plates of said stack of plates,
   said lengths of wire being movable between said plates so that the wires can be moved when the plates are loosely stacked on one another, and
   means to releasably clamp the plates together to prevent said lengths of wire from moving between said plates.

7. The apparatus of claim 6 in which the clamping means of the wire moving and the wire holding mechanisms are arranged to be actuated alternately.

8. The apparatus of claim 4 in which said means for bending portions of said terminals after said terminals are more deeply embedded in said plastic part includes:
   at least one wire bending blade having a hook-like portion engageable with portions of said terminals which extend out of said plastic part, said blade being movable in a plane extending generally perpendicular to said terminals and, means for moving said blade in a plane from a first position on one side of said terminals to thereby bend portions of said terminals to extend at right angles to the remaining portions thereof.

9. The apparatus of claim 8 in which said means for moving said blade in said plane includes a cam follow surface carried by said blade and a cam engaging said cam follower surface, said cam being mounted on a shaft extending perpendicular to the plane of movement of said blade.

10. The apparatus of claim 8 including a pair of wire bending blades which are movable reciprocally towards and away from each other and which are positioned so that their hook-like portions face each other.

11. The apparatus of claim 1 in which said means for simultaneously severing end portions from said lengths of wire to form a plurality of terminals, includes:

a blade having a plurality of wire passages formed therein, a slidable insert having a plurality of wire passages formed therein and aligned with said wire passages in said blade in at least one position of said blade, a face plate having a plurality of wire passages formed therein and aligned with said wire passages in said blade and said sliding insert in at least one aligned position of said blade and said sliding insert, said blade being mounted for sliding movement relative to said slidable insert to sever lengths of wire extend through said blade, said sliding insert and said face plate to form wire terminals, and means to slide said slidable insert relative to said front plate after the wire terminals are withdrawn from said slidable insert to enable said insert to function as a backing member for said terminals during embedding of said seated terminals in said plastic part.

12. The apparatus of claim 11 in which a pair of blades are mounted for sliding movement relative to said slidable insert with said blades each having a plurality of wire passages formed therein and movable toward each other to sever said lengths of wire.

13. The apparatus of claim 12 including means for sliding said blades toward each other to sever said lengths of wire, said means including a free floating air cylinder having an extendible piston rod engaging one of said sliding blades and a yoke attached to the air cylinder engaging the other sliding blade so that actuation of the air cylinder will squeeze the blades together.

14. The apparatus of claim 13 in which said yoke is rotatably mounted on said air cylinder for adjustment about the longitudinal axis of the air cylinder.

* * * * *